D. T. WARD.
Rotary Churn.
No. 30,941. Patented Dec. 18, 1860.
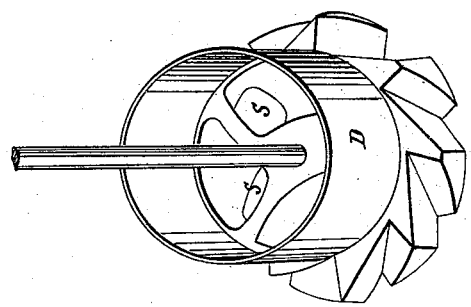
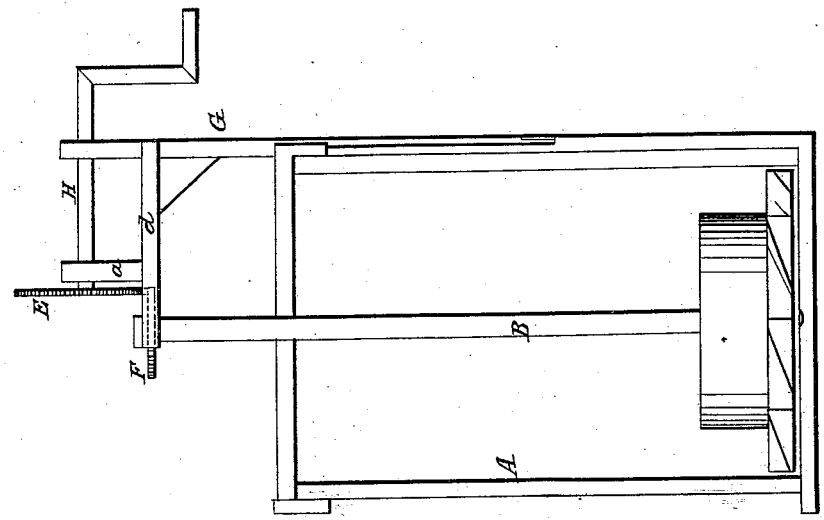
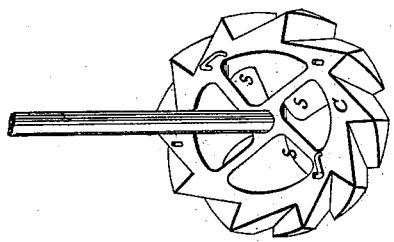
Witnesses.
C. M. Alexander
A. A. Yeatman
Inventor.
D. T. Ward.

UNITED STATES PATENT OFFICE.

D. T. WARD, OF MANSFIELD, OHIO.

CHURN.

Specification of Letters Patent No. 30,941, dated December 18, 1860.

*To all whom it may concern:*

Be it known that I, D. T. WARD, of Mansfield, in the county of Richland and State of Ohio, have invented certain new and useful Improvements in Churns; and I do hereby declare that the following is a full, clear, and exact description of the same, reference being had to the accompanying drawings and to the letters of reference marked thereon.

The nature of my invention consists in constructing and arranging the several parts of this churn in the manner hereinafter set forth.

In the annexed drawings, making a part of this specification, A, represents a square churn box, which is constructed in any of the known ways and made of any suitable size.

B, represents the dasher staff, which is provided at its upper end with a wheel F, which is provided with teeth and which gears into a toothed wheel E. The wheel E, is secured upon a shaft H, which has its bearings in an adjustable or movable upright G, and a standard *a*, upon an arm *d*, secured to said upright G. The dasher staff is revolved by means of the wheels E, and F, as is clearly seen when motion is communicated to them through crank shaft H. Upon the lower end of the staff B, is secured a disk or wheel C, which is constructed in the peculiar manner shown in the figures its rim being serrated and the material of which it is made being cut away near the rim from the face to the under side so as to form a series of wedge shaped projections as it were.

Secured upon the upper face of the disk, is a wide rim or collar D. This collar rests upon the disk, between the wedged shaped projections, and a series of openings *s, s*, through the disk. The holes *s, s*, are cut through the disk in an inclined, or slanting manner as is shown—the inclination on the face of the disk being adverse to the inclination of the wedged shaped projections. When this disk and rim, or collar are revolved rapidly the milk is cut and agitated by the projections on the disk, and also is given an upward tendency by them. It is thrown into the collar D, and passes out at the openings *s, s, s*. Thus a constant stream or current is produced from the out to the inside of the collar and vice versa. The butter remains and is gathered in the collar while the milk as has been stated passes out at the openings *s, s, s*.

I am aware that currents have been formed before hence and I do not claim such; but,

Having thus fully described my invention, what I claim as new and desire to secure by Letters Patent is—

The disk or wheel C, constructed as described and in connection therewith the rim or collar D, arranged in the manner and used for the purpose herein specified.

D. T. WARD.

Attest:
   G. F. CARPENTER,
   P. C. RENFREW.